US010793452B2

(12) United States Patent
Frohlich et al.

(10) Patent No.: US 10,793,452 B2
(45) Date of Patent: Oct. 6, 2020

(54) RECOVERING SOLID WASTE BRINE FROM PROCESSED WATER UTILIZING A FLUIDIZED BED SPRAY GRANULATOR SYSTEM

(71) Applicant: Andritz Separation Inc., Arlington, TX (US)

(72) Inventors: Nicholas Robert Frohlich, Lebanon, OH (US); Marcus Hauptmann, Arlington, TX (US); Paul Bernhard Kroehl, Ravensburg (DE)

(73) Assignee: Andritz Separation Inc., Arlington, TX (US)

( * ) Notice: Subject to any disclaimer, the term of this patent is extended or adjusted under 35 U.S.C. 154(b) by 175 days.

(21) Appl. No.: 14/931,323

(22) Filed: Nov. 3, 2015

(65) Prior Publication Data

US 2016/0159668 A1 Jun. 9, 2016

Related U.S. Application Data

(60) Provisional application No. 62/087,921, filed on Dec. 5, 2014.

(51) Int. Cl.
*C02F 1/52* (2006.01)
*B01D 1/18* (2006.01)
(Continued)

(52) U.S. Cl.
CPC ............... *C02F 1/52* (2013.01); *B01D 1/18* (2013.01); *F26B 3/08* (2013.01); *F26B 3/12* (2013.01); *C02F 1/02* (2013.01); *C02F 2001/5218* (2013.01); *C02F 2101/10* (2013.01); *C02F 2103/36* (2013.01); *F26B 2200/18* (2013.01)

(58) Field of Classification Search
None
See application file for complete search history.

(56) References Cited

U.S. PATENT DOCUMENTS

| 4,421,594 A * | 12/1983 | Bildjukevich | ........... B01D 1/18 159/16.1 |
| 4,699,721 A * | 10/1987 | Meenan | .................... C02F 1/02 110/237 |
| 2014/0048408 A1 * | 2/2014 | Van Der Merwe | ...... B01D 1/16 203/88 |

OTHER PUBLICATIONS

Lytron total thermal solutions. The best heat transfer fluids for liquid cooling. Accessed from www.lytron.com on Jan. 2, 2018. Web Archives dated back to Jul. 14, 2011.*

(Continued)

*Primary Examiner* — Kara M Peo
(74) *Attorney, Agent, or Firm* — Robert J. Hornung

(57) ABSTRACT

A process for recovering solid waste from produced water in an oil sands system utilizing a fluidized bed, comprising: transferring an amount of produced water into a solution tank, producing an enriched salt solution in the solution tank, transferring the enriched salt solution using at least one spray nozzle into a fluidized bed of a fluidized bed spray granulator, heating the fluidized bed with a gas, growing granules within the fluidized bed through evaporative drying of salt from the enriched salt solution, extracting the granules from the fluidized bed spray granulator to produce a granulator product, separating at least a portion of the granulator product into at least two fractions, and removing at least a portion of at least one of the at least two fractions from the system as solid waste brine product.

30 Claims, 9 Drawing Sheets

(51) Int. Cl.
*F26B 3/12* (2006.01)
*F26B 3/08* (2006.01)
*C02F 1/02* (2006.01)
*C02F 101/10* (2006.01)
*C02F 103/36* (2006.01)

(56) References Cited

OTHER PUBLICATIONS

VA Tech WABAG, Fluid Bed Technology, Spray Granulation Utilizing Fluid Bed Technology Escher Wyss, 2000, pp. 1-8, VA Tech, Ravensburg, Germany.

Oil Sand Magazine, In-Situ Bitumen Extraction, 2020, pp. 1-7, Canada.

\* cited by examiner

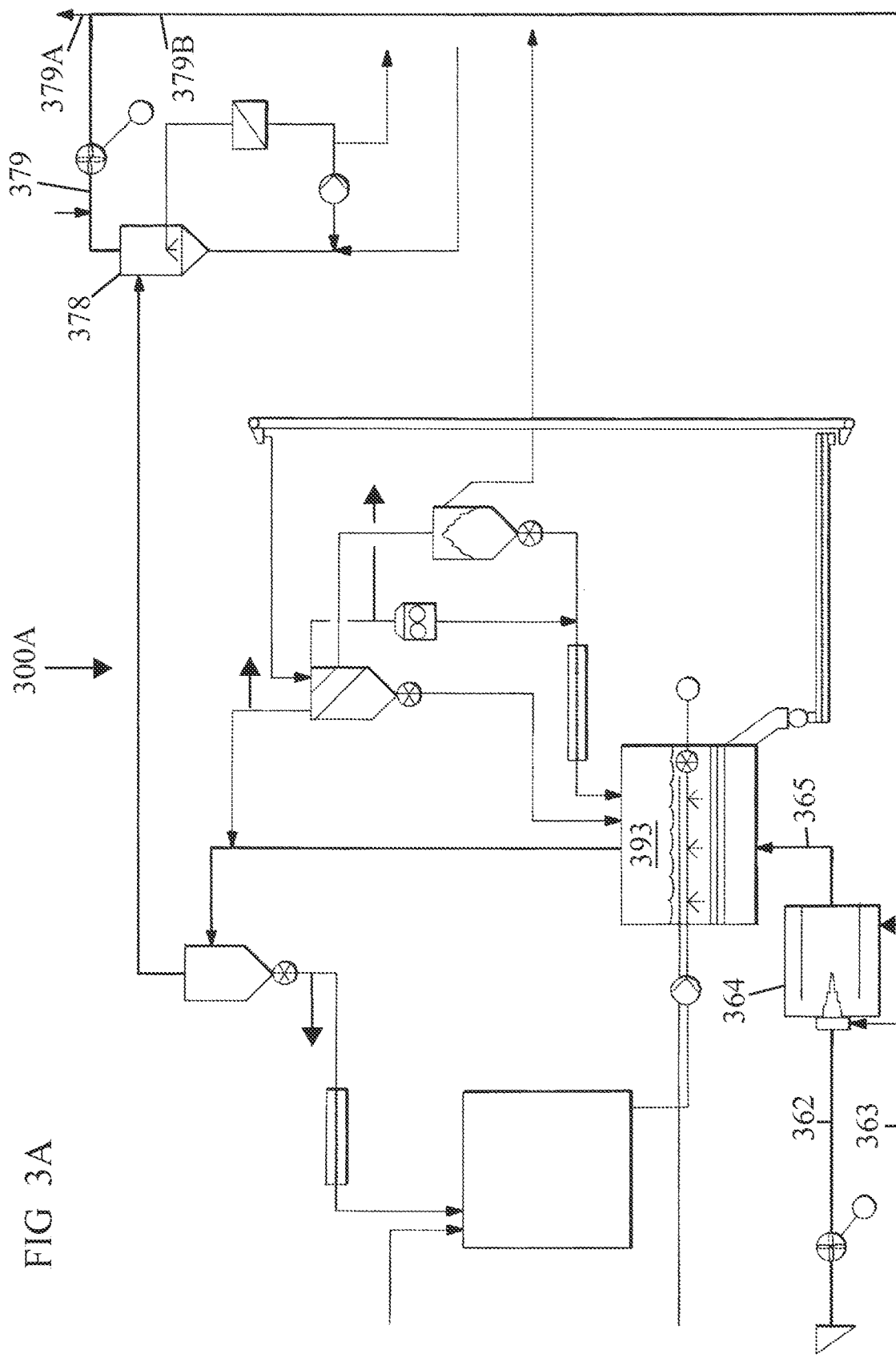

RECOVERING SOLID WASTE BRINE FROM PROCESSED WATER UTILIZING A FLUIDIZED BED SPRAY GRANULATOR SYSTEM

CROSS-RELATED APPLICATION

This application is a Non-Provisional application claiming the benefit of priority to U.S. Provisional Patent Application Ser. No. 62/087,921 filed Dec. 5, 2014, the entirety of which is incorporated by reference herein.

TECHNICAL FIELD

Aspects of the disclosure relate generally to a method and system of recovering solid waste brine from produced water utilizing a fluidized bed spray granulator system. The fluidized bed spray granulator system may be added to functioning pre-existing produced water treatment system, e.g., for oil sands (also referred to in some regions as tar sand) evaporator blow off material. Benefits may include reduction of the quantity of waste water and a relatively easier production of a disposed solid waste brine.

BACKGROUND

Currently, during the production of oil and other hydrocarbon recovery processes, such as, oil sands, shale oil, hydraulic fracturing, etc. steam assisted gravity drainage ("SAGD") is used. SAGD is a process where steam is injected into a heavy oil reservoir, such as into oil sands, to assist in the removal of the heavy oil from the reservoir (some also refer to this removal of heavy oil from the reservoir as "washing"). The SAGD process uses a pair of horizontal wells drilled into a heavy oil/bitumen reservoir. One horizontal well is located a few meters above the second horizontal well. Usually high pressure steam is continuously pumped into the upper well (also called the injector well). Gravity helps the steam (and therefore the heat from the steam) to move down through the layers of rock, sand, and ground (dirt) between the two parallel wells heating the layers of rock, sand, and ground containing the heavy oil and bitumen.

As the steam from the upper well moves vertically downward and heats the rock, sand, and ground between the upper and lower wells, the viscosity (viscosity being a measure of how resistant a liquid is to flowing—high viscosity means hard to flow, low viscosity means easier to flow) of the heavy oil/bitumen between the wells is reduced thereby allowing the liquid oil to flow.

Reduction of the heavy oil/bitumen's viscosity allows the heated oil product (heavy oil) to flow from the rock, sand, and ground and drain into the lower well along with the steam and water condensed from the steam used to heat the heavy oil/bitumen in the rock, sand, and ground. Once the oil product enters the lower well, the oil product and the water from the steaming process are pumped to the surface.

Generally, for SADG to be successful, a large volume of steam is typically required to be injected into the injector well. Production of the necessary volume of steam means large volumes of water are also typically required. To generate the injection steam needed, once-through steam generators ("OTSG") have been used.

An OTSG is an industrial device which heats large volumes of water to produce large volumes of steam or steam and liquid mixes. Because of the high volume of steam for the SAGD process, there may not be a sufficient amount of fresh water available to produce the quantity of required steam in the OTSG. Therefore, it is often necessary to recover water removed from the SADG process (water removed with the oil) as water to be used in the OTSG. This recovered water is referred to as "produced water."

Produced water is a remaining byproduct of the oil product and water from the steam injection. Because it is often necessary to use produced water, and because of the various contaminants in produced water, it is generally not usable without further treatment. Produced water undergoes a series of treatment steps to reduce the amount of contaminants contained in the produced water. Once the treated produced water is considered useable, it may be re-used to produce steam and re-injected into a well.

Although conventional produced water treatment systems may attempt to separate contaminants from the produced water, there may be a significant portion of liquid remaining in the waste brine, often in the form of sludge or filtered waste (from a conventional warm/hot lime produced water treatment system) or secondary treatment waste (from an evaporator produced water treatment system). Such waste brine should be disposed of in governmentally approved ways, usually in efforts to preserve the environment.

Most companies operating SAGD for oil recovery also seek to recover water from the waste brine. Conventional water recovery systems may be able to recover 98% of the reusable water. Even with high recoverability, the volume of waste brine requiring disposal can remain large. In order to dispose of the waste brine, companies using SAGD systems often pay disposal companies to haul away the large volumes of waste brine, the waste brine having large quantities of water. Waste brine disposal costs for some SAGD system users can easily rise to over $1,000,000 per month.

As a result of ever-changing environmental regulations and laws, especially laws dealing with the disposal of liquid waste (a category into which waste brine from conventional produced water treatment systems fall), liquid waste disposal companies and haulers may be reluctant to enter into long-term contracts for waste brine removal. It is believed changes in environmental law have and will continue to result in increased hauling and disposal costs or even eliminate the possibility of hauling and disposing of liquid waste, including waste brine.

A system for further concentrating the liquid wastes resulting from the produced water treatment systems, especially oil sands oil recovery processes, could benefit industries that utilize produced water and wish to reduce the volume and mass of unusable waste. Such a system could be added to an existing produced water treatment system. Reducing the amount of water in waste streams, such as waste brine, which should be disposed, and reducing the quantity of water used in the produced water treatment systems by forming concentrated solids, could not only significantly increase the reusable water, but could also reduce the volume and mass of disposable waste resulting from produced water treatment systems.

The resulting solid waste brine, a solid mass, can be hauled away from the produced water treatment system site and disposed of more easily than the higher volume, liquid waste containing stream of waste brine. Not only could this process eliminate the need to meet liquid waste disposal requirements (thereby reducing adverse impact on the environment), but it could also result in a significant reduction in disposal costs. The concentrated solid waste brine may also be useful in other applications where solid brine material is needed, for example, other water and wastewater treatment processes.

SUMMARY OF INVENTION

Waste brine currently includes a large volume of water, and disposal of waste brine may be costly and/or limited, a system to reduce the volume of waste brine to be disposed of may be desired.

A method and system of recovering solid waste (solid waste brine) from produced water in an oil sands system for the production of oil and other hydrocarbons have been conceived. The method and system of recovering solid waste brine utilizes a fluidized bed spray granulator, e.g., to provide evaporative drying. This fluidized bed spray granulator system may be used independently of other produced water treatment systems or may be used in addition to produced water treatment systems to reduce the mass and volume of disposable waste (solid waste brine) produced.

The conceived system may use a fluidized bed spray granulator to evaporate liquid (water) from a liquid stream of concentrated or enriched salt solution. As the enriched salt solution enters the fluidized bed, hot air that is continuously fed to the fluidized bed spray granulator, evaporates the liquid from the enriched salt solution, by a process known as evaporative drying. The fluidized bed may be composed of salt crystal granules (granules).

As a result of evaporative drying, the granules in the fluidized bed may grow (increasing in size) as salt from the enriched salt solution is deposited on the granules. A stream of granules may be discharged from the fluidized bed spray granulator.

The fluidized bed spray granulator discharge product ("granulator product") may include differently sized granules. These granules may be subsequently separated by size into three or more fractions, such as two or three fractions. The three fractions may be known as an unders fraction ("unders"), a middle fraction, and an overs fraction ("overs"). If the granulator product is separated into only two fractions, the fractions may be known as unders and overs.

The unders fraction, which may be made of smaller particles of a size similar to dust, may be recovered as return unders and may be recycled to a tank containing produced water or removed from the system as solid waste brine product. Return unders may be used to increase the salt concentration of the produced water to yield an enriched salt solution. The enriched salt solution may then sent to the fluidized bed spray granulator for treatment.

The overs fraction, which may be made of larger particles of a size similar to lumps, may be removed from the system or may be crushed, or otherwise processed to reduce the size of the granules. Once the overs are optionally reduced in size, they may be recycled to the fluidized bed spray granulator as granules to form the fluidized bed.

The middle fraction, if existing, may be further divided into two portions. One portion of the middle fraction may be recycled to the fluidized bed spray granulator as granules for the fluidized bed, while another portion may be removed from the process as solid waste brine product. The solid waste brine may be stored for use in traditional water treatment plants, or for use as granules in the restarting of the fluidized bed spray granulator, or even removed from the system and sent to solid waste disposal.

The fluidized bed spray granulator may also produce an exhaust gas and dust stream. Exhaust gas and dust stream is formed when water in the enriched salt solution undergoes evaporative drying by hot gas fed to the fluidized bed spray granulator, forming water vapor. The exhaust gas and dust stream may include water vapor from the evaporation of the enriched salt solution as well as a portion of the unders caught or entrained in the water vapor. Exhaust gas and dust stream from the fluidized bed spray granulator may be treated (for example, by a dry dust collector and then a wet scrubber) to remove at least a portion of the unders fraction (fines or unders entrained in the water vapor). The resulting treated or scrubbed exhaust gas can be safely removed from the system.

The conceived system may be helpful to the oil recovery industry, specifically for oil recovery processes from oil sands, which may currently utilize SAGD for oil recovery, or OTSG for steam generation, or a combination of both SAGD and OTSG processes in the treatment of produced water resulting from the recovery of oil.

BRIEF DESCRIPTION OF THE DRAWINGS

The foregoing will be apparent from the following more particular description of the prior art (conventional) systems and the exemplary embodiments of the conceived systems, as illustrated in the accompanying drawings, where like reference characters refer to the same parts throughout the different drawings. The drawings are not necessarily to scale, emphasis instead being placed upon illustrating embodiments of the conceived system.

FIG. 3A schematically exemplifies a process flow diagram of a fluidized bed spray granulator system with exhaust gas recirculation.

DETAILED DESCRIPTION

The following detailed description of the preferred embodiments is presented only for illustrative and descriptive purposes and is not intended to be exhaustive or to limit the scope and spirit of the conceived system. The embodiments were selected and described to explain the principles of the conceived system and its practical application. A person of ordinary skill in the art may recognize many variations can be made to the systems and methods described in this specification without departing from the scope and spirit of the described systems and methods.

Figure 1:
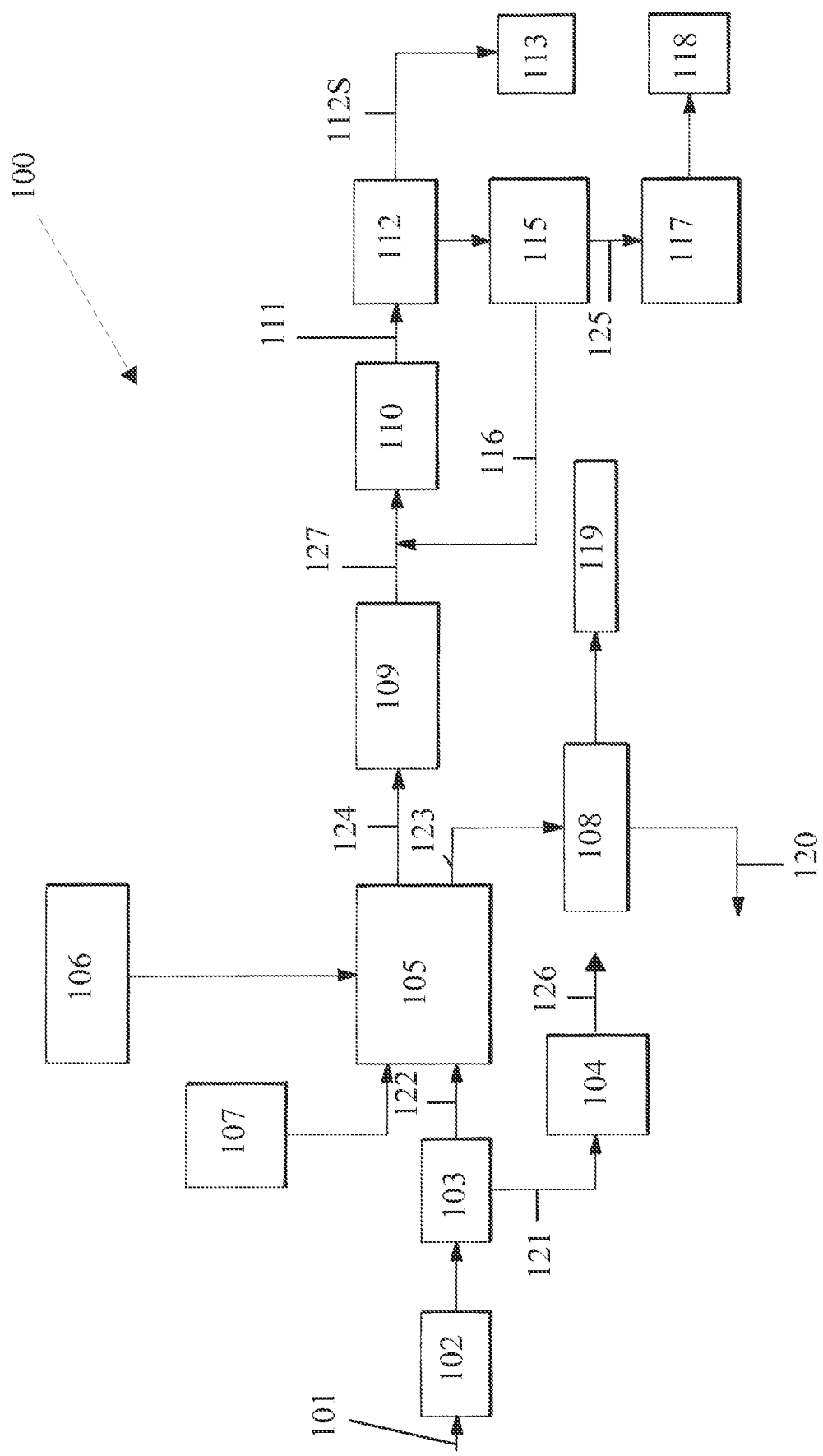
FIG. 1 is a simplified flow diagram of a prior art conventional warm/hot lime produced water treatment system.
Figure 2:
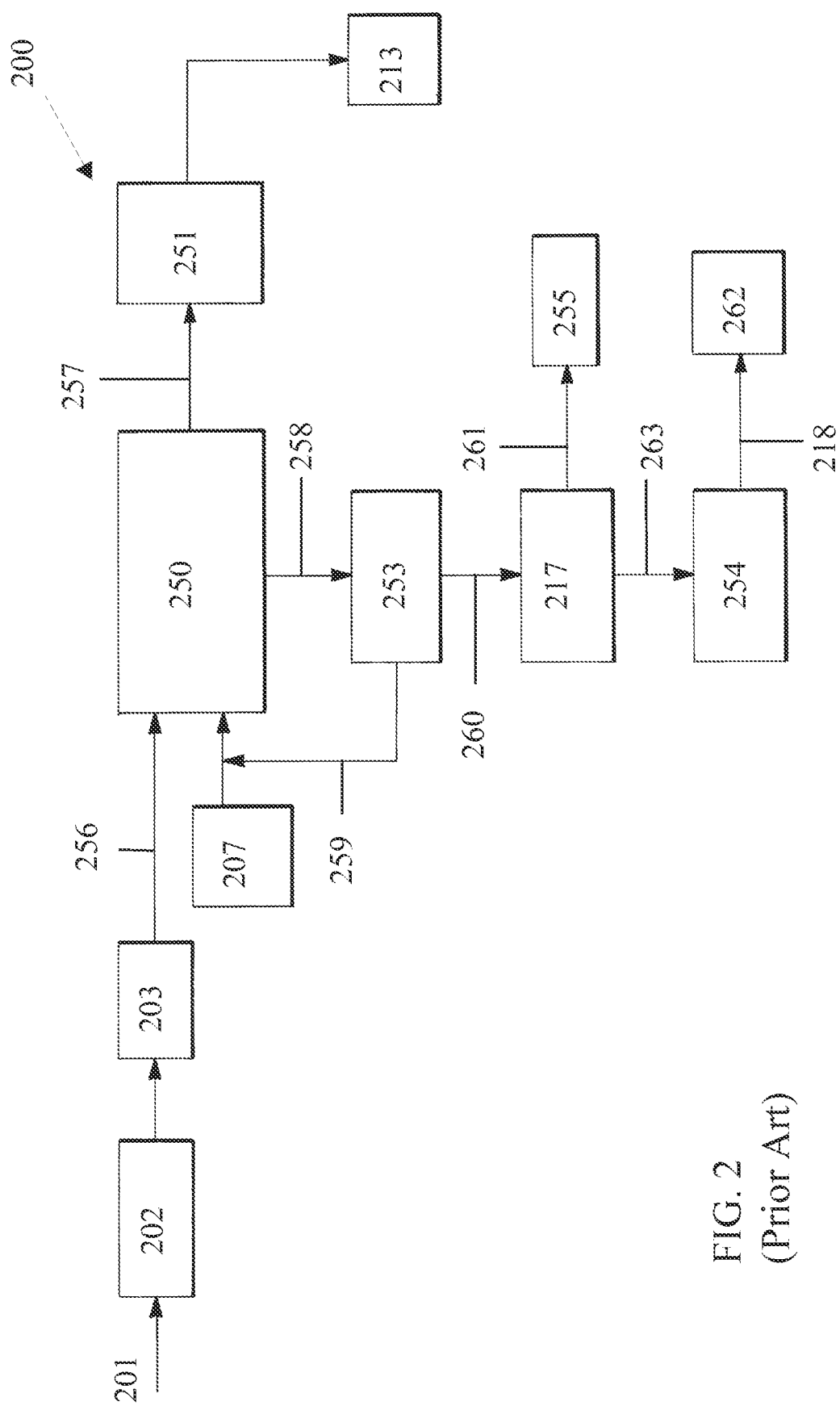
FIG. 2 is a simplified flow diagram of a prior art conventional evaporator produced water treatment system.
Figure 3:
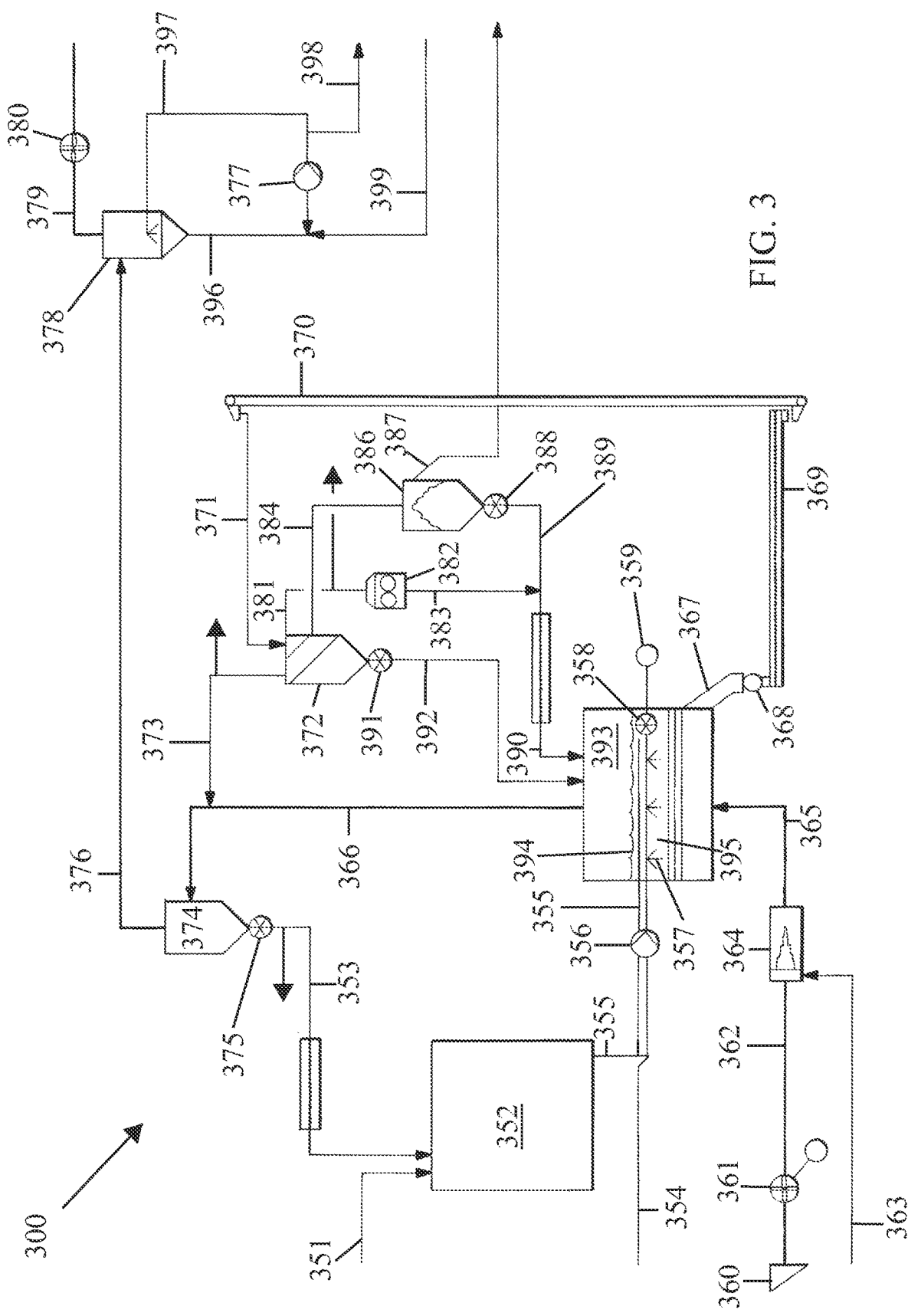
FIG. 3 schematically exemplifies a process flow diagram of a fluidized bed spray granulator system.
Figure 4:
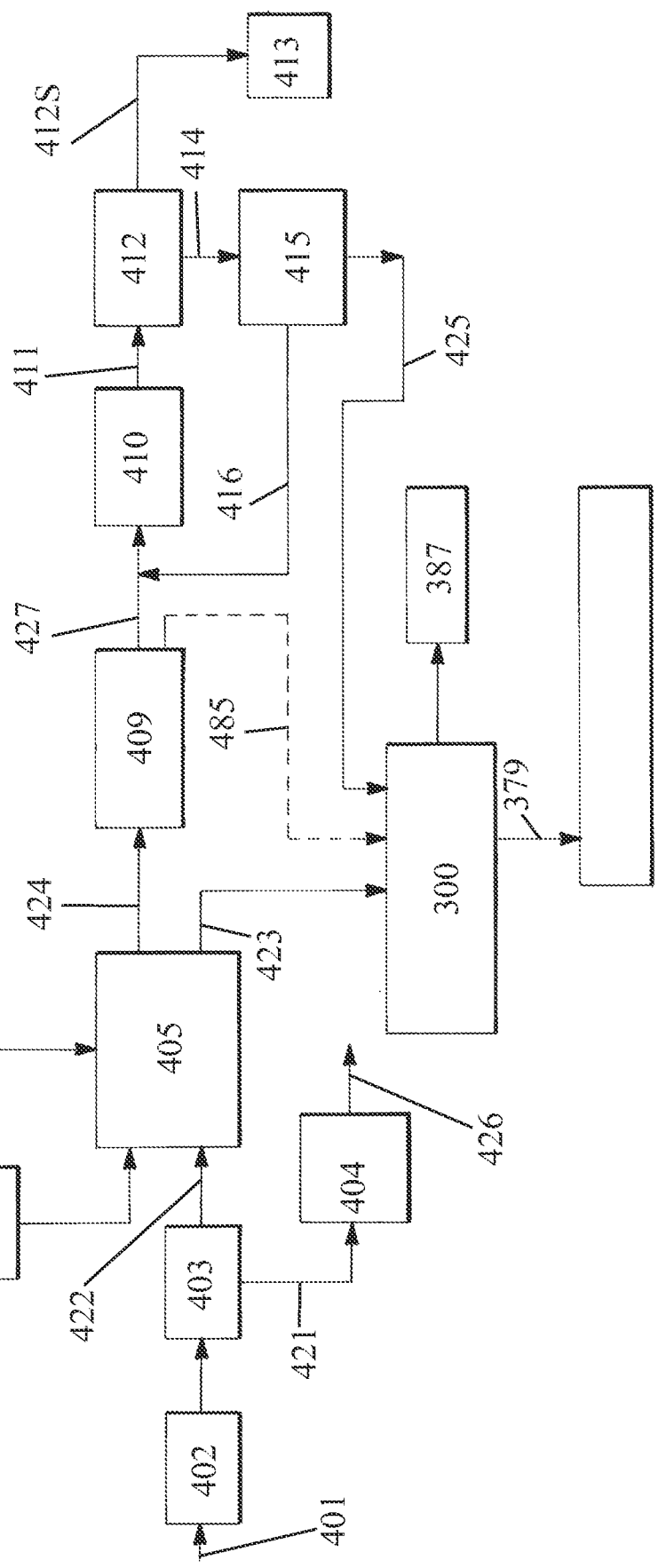
FIG. 4 schematically exemplifies a simplified flow diagram depicting use of a fluidized bed spray granulator system within a warm/hot lime produced water treatment system.
Figure 5:
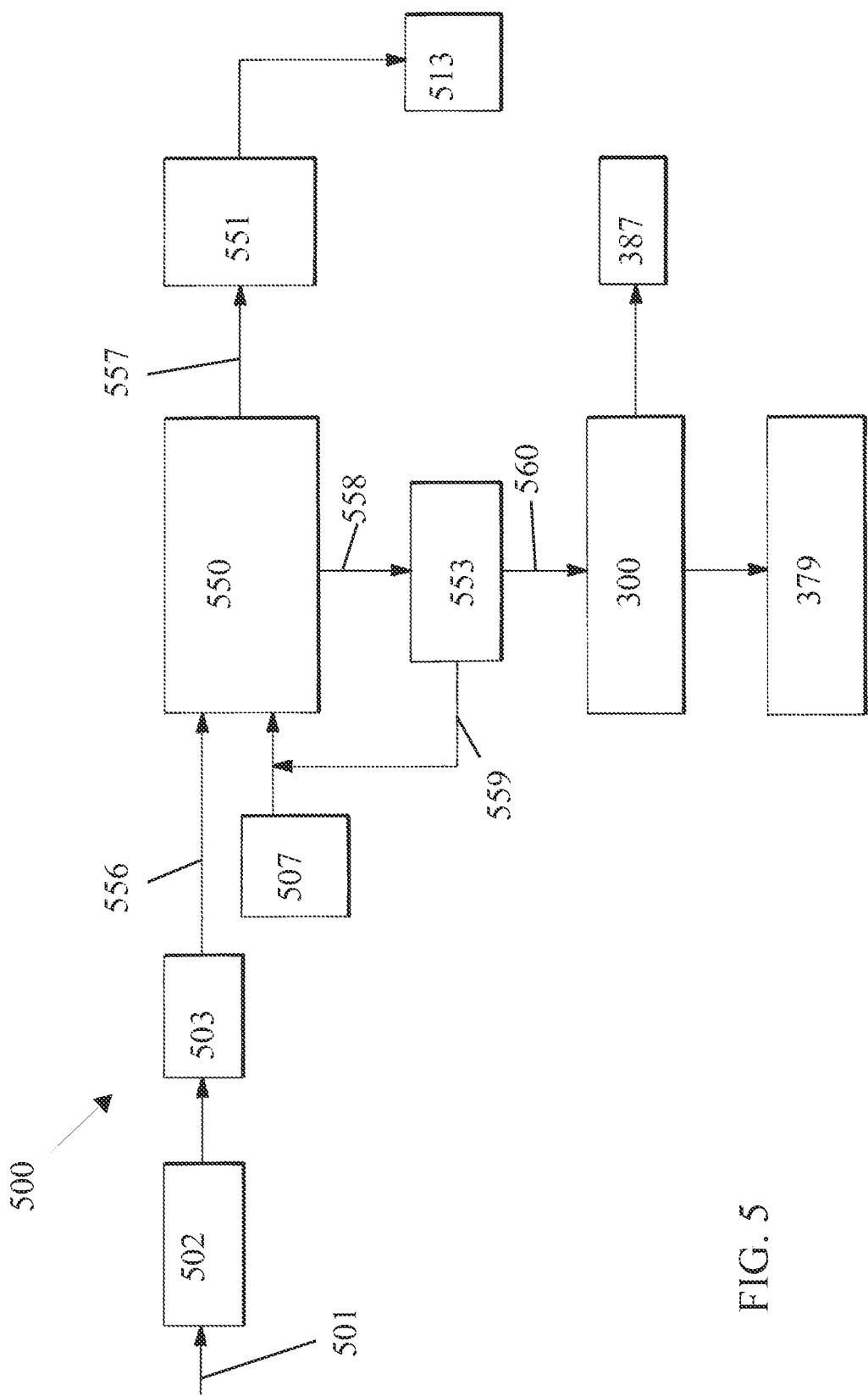
FIG. 5 schematically exemplifies a simplified flow diagram depicting use of a fluidized bed spray granulator system within an evaporator produced water treatment system.

Illustrative, exemplary embodiments of the fluidized bed spray granulator system in accordance with this disclosure are shown in FIGS. 3 to 5. FIGS. 1 and 2 are prior art (conventional) produced water processing systems.

FIG. 1 shows a conventional warm/hot lime produced water treatment system 100. Produced water 101 is sent to a free water knockout step 102 followed by a de-oiling process 103. The de-oiling process 103 provides two products 121, 122. De-oiling process product A 121 is funneled into a slop treatment 104. Slop treatment 104 uses a filter press and centrifuge (not depicted) in order to further separate and reduce the waste. Slop treated stream 126 is removed from the warm/hot lime produced water treatment system 100.

De-oiling product B 122 from the de-oiling process 103 is channeled into a warm lime softening or hot lime softening process ("warm/hot lime softening process") 105. The warm/hot lime softening process 105 may utilize lime, magnesium oxide, or soda from silo 106, and sometimes requires silica, calcium, and magnesium reduction as well as make-up water 107.

The warm/hot lime softening process 105 has two products. The products from the warm/hot lime softening process 105 are lime softener sludge 123 and lime softening liquid 124.

Lime softener sludge 123 proceeds to lime sludge softening treatment 108. The lime sludge softening treatment 108 may use a centrifuge and/or a filter press to separate and reduce waste and yields a sludge dry solids 119 and a sludge recycle stream 120. The sludge dry solids 119 and the sludge recycle stream 120 may be returned for use elsewhere in the treatment system (for example in the produced water system).

Lime softening liquid 124 is filtered in filters 109. Filters 109 produce a filtered waste stream 127.

The filtered waste stream 127 may be further processed by a weak acid cation exchange and/or strong acid cation exchange (weak/strong acid cation exchange 110). An acid cation exchange stream 111 from the weak/strong cation exchange 110 is then transferred to an OTSG 112. The OTSG 112 produces OTSG steam 112S and an OTSG waste product 114. OTSG steam 112S may be injected into a steam injection well 113.

The OTSG waste product 114 from OTSG 112 is transferred to a blowdown evaporator 115 where water is evaporated off of the OTSG waste product 114. Blowdown evaporator water 116 from the blowdown evaporator 115 may be recycled to the weak/strong acid cation exchange 110 and subsequently to the OTSG 112. The blowdown evaporator solid waste 125 from the blowdown evaporator 115 may be sent to a zero liquid discharge evaporator and crystallizer system ("ZLD") 117 for further processing and disposal as waste brine 118. Typically, for a medium-sized ZLD system, 2,000 barrels per day of waste brine 118 are sent to disposal.

Another conventional system is shown in FIG. 2, which shows an evaporator produced water treatment system 200. There are common equipment and process steps between the evaporator produced water treatment system 200 of FIG. 2 and the warm/hot lime produced water treatment system 100 of FIG. 1. While the conventional evaporator produced water treatment system 200 does have many similar processes steps compared to the warm/hot lime produced water treatment system 100, the evaporator produced water treatment system 200 has fewer waste streams requiring disposal.

In the evaporator produced water treatment system 200, produced water 201 is funneled through a free water knockout step 202, and through a de-oiling process 203. The de-oiling process 203 may be similar to the de-oiling process 103, of the warm/hot lime produced water treatment system 100 of FIG. 1, but the evaporator produced water treatment system 200 yields a single product stream, evap de-oiling product 256. The evap de-oiling product 256 is sent to an evaporator 250.

Evaporator 250, much like other evaporators, produces two product streams: evaporator product A 257 and evaporator product B 258. Evaporator product A 257 is sent to a drum boiler 251 or possibly an OTSG like that of FIG. 1 where steam is produced and the resulting steam is used in steam injection wells 213. The second product from evaporator 250 is evaporator product B 258. Evaporator product B 258 can be classified as a sludge waste and may undergo further processing in a secondary treatment step 253.

Secondary treatment step 253 can take various forms, but may also include a filter press, centrifuge, or other forms of filtration. Useable water 259 resulting from the secondary treatment step 253 may be directed back into the evaporator 250. It may be necessary to add make-up water 207 to evaporator 250. The remaining secondary treatment waste 260 is channeled into a crystallizer or other appropriate equipment (ZLD 217).

As a result of processing the secondary treatment waste 260 in the ZDL 217 two products are formed: dry solids 261 and disposal water 263. The dry solids 261 are disposed of in dry solids disposal 255 while the disposal water 263 from the ZDL 217 is processed through a disposal water treatment process 254 to form waste brine 218. Waste brine 218 is finally sent to disposal well injection 262. Typically, 500 cubic meters per day of waste brine 218 are sent to disposal well injection 262.

FIG. 3 schematically exemplifies a simplified flow diagram of an embodiment of a fluidized bed spray granulator system 300. Shown in FIG. 3 is a system which can be used without prior treatment of produced water from the recovery of oil from oil sands. The system of FIG. 3 may also be incorporated into existing produced water treatment systems. The incorporation of the fluidized bed spray granulator system 300 into produced water treatment systems is shown in FIGS. 4 and 5.

Liquid feed 351 to the fluidized bed spray granulator system may be "produced water" directly from the oil sands oil recovery process. Liquid feed 351 may be transported to the solution tank 352. The liquid feed 351 transported to the solution tank 352 may be: 1) primary produced water 2) secondary produced water. Primary produced water is produced water (from the oil sands recovery process) having received no treatment or efforts made to remove contaminants from the produced water. Secondary produced water has been through at least one treatment process.

Liquid feed 351 may also be liquid waste from conventional produced water treatment systems such as lime softener sludge 123 as shown in FIG. 1, or filtered waste stream 127 from FIG. 1. Other possible sources of liquid feed 351 include secondary treatment waste 260 from FIG. 2, or any other liquid stream having a high volume of waste water with solid material such as salt.

The solution tank 352 may be a single tank, may be a series of tanks with or without mixing equipment, or may involve some tanks with mixing equipment and others without mixing equipment.

Return unders 353 discharged via an optional dust collector rotary air lock 375 from dust collector 374 (the dust collector 374 may be a cyclone or other equipment suitable for separating entrained or contained dust from other exhaust gas components) may be directed to solution tank 352 where the feed liquid 351 and return unders 353 are mixed. It is also possible for the return unders to be removed from the system for disposal. Return unders 353 from the dust collector 374 is produced from the treatment in the dust collector 374 of exhaust gas and dust 366 from the fluidized bed spray granulator 393. As a result of treatment in the dust collector 374, the exhaust gas and dust 366 may be separated into two streams: dust collector exhaust gas 376 and return unders 353.

The return unders 353, high in salt, may be used to increase the concentration of salt in the feed liquid 351 until the material in the solution tank is near saturation. The material in the solution tank 352 near its salt saturation point is referred to as "enriched salt solution" 355. The salt saturation of the liquid feed 351 may occur at 25-27 wt % solids concentration (salt) at 50° C.

Once formed, the enriched salt solution 355 may be sprayed through at least one spray nozzle 357 into the fluidized bed spray granulator 393. In some instances prior to spraying the enriched salt solution 355 into the fluidized bed spray granulator 393, the enriched salt solution 355 may be mixed with pressurized air 354. The at least one spray nozzle 357 may be submerged within a fluidized bed upper layer 394 of the fluidized bed spray granulator 393.

The fluidized bed spray granulator 393 may have a set of spray nozzles 357 such as two phase spray nozzles or other suitable nozzles. A fluidized bed 395 is formed when a solid material placed in a layer (bed) obtains fluid qualities similar to the fluid qualities of a liquid. A solid layer or bed takes on the fluid qualities similar to those of a liquid when a pressurized substance, in this instance hot gas 365, is applied in a way that mobilizes the solid material, in this case granules, thereby becoming fluidized.

Hot gas 365 is the combustion product of ambient air 362 and fuel gas 363. Ambient air 362 may have been filtered using ambient air filter 360 and may have been transported to the combustor 364 via ambient air supply fan and motor 361. The hot gas 365 may be supplied to the fluidized bed 395.

In this disclosure, the granules used at the start-up of the fluidized bed spray granulator 393 or when the fluidized bed medium (solids forming the fluidized bed 395) must be replaced or restarted, may also be referred to as evaporative drying seeds and are typically pretzel salt (e.g., salt used on an edible pretzel) or fines (unders fraction) from the fluidized bed spray granulator 393 granulator product 371.

The mobilized or fluidized granules of the fluidized bed 395 resemble a boiling liquid and form what is commonly referred to as a "fluidized bed." The spray nozzles 357 may be submerged in the fluidized bed 395 to ensure good contact between the enriched salt solution 355 sprayed into the fluidized bed 395 and the granules within the fluidized bed 395. Placement of the spray nozzles 357 should be within the fluidized bed 395 and not merely positioned to have the enriched salt solution 355 added to the surface of the fluidized bed upper layer 394. Spray nozzles 357 atomize the enriched salt solution 355 into the fluidized bed 395 of granules.

Hot gas 365, used to aerate the granules in the fluidized bed 395, is typically at 85-100° C. and aids in the evaporative drying process, i.e. evaporating the water off of the incoming enriched salt solution 355. It may be necessary to heat the hot gas 365 prior to being used in the fluidized bed 395. Water vapor, along with some entrapped dust (the dust being very fine dry particles could also be referred to as fines or unders), may be removed from the fluidized bed spray granulator 393 via the exhaust gas and dust 366 stream. The removed water vapor, exhaust gas and dust 366, may be sent for further processing in the dust collector 374.

The granules and hot gas 365 within the fluidized bed spray granulator 393 come into contact with the enriched salt solution 355 introduced into the fluidized bed spray granulator 393 via spray nozzles 357. Dissolved salt particles are contained in the enriched salt solution 355. The enriched salt solution 355 entering the fluidized bed spray granulator 393 is contacted by the hot gas 365 and the granules in the fluidized bed layer 395. By means of evaporative drying, the granules in the fluidized bed layer 395 increase in size by the addition of salt particles from the incoming enriched salt solution 355.

The evaporative drying process may create onion-like layers on the granules, giving them the appearance of "growing." Once the majority of the granules reach a desired size, the granules (now referred to as granulator product 371) are withdrawn or discharged from the fluidized bed spray granulator 393 through the fluidized bed spray granulator product discharge 367 using an optional granulator product discharge rotary valve 368. After removal of the stream of granulator product 371 from the fluidized bed spray granulator 393, the granulator product 371 may be transferred via a granulator product conveyor 369 (a screw conveyor or other suitable conveying equipment) and a granulator product transport device 370 (a suitable transport device may be a bucket elevator) to a granulator product screener 372.

In the granulator product screener 372, the granulator product 371 may be separated into three portions: overs 381 (particles larger than the desired size also referred to as lumps), middle fraction 384 (particles of the desired size may also be referred to as middles) and unders.

The granulator product 371 may be separated into three fractions, although it is also possible to separate the granulator product 371 into more or fewer than three fractions. If only two fractions are formed, they are the unders and overs 381 fractions. In the case of only two fractions, the unders may be returned to the solution tank 352 or be removed from the system. When only two fractions are formed, the overs 381 may be treated to reduce their size (as described below) and recycled to the fluidized bed spray granulator 393 or removed from the system.

Without regard for the number of fractions into which the granulator product 371 is separated, the unders fraction may be further divided into two streams. For example, a first stream of unders may be unders to dust collector 373 which may be sent to the dust collector 374 and from dust collector 374 be recycled to the solution tank 352 to increase the liquid feed 351 salt concentration. A second unders stream may be removed from the granulator product screener 372 and returned via rotary valve 391 (or other appropriate equipment) to the fluidized bed spray granulator 393 as recycle unders 392.

The overs 381 (or lumps) fraction, which may be formed as a result of upset conditions and heat losses on the walls of the fluidized bed, may be discharged from the granulator product screener 372 and transported to a crusher 382 where the oversized material is crushed into a desired size. The crushed overs 383 may be returned to the fluidized bed spray granulator 393 for continued processing.

The dust collector 374 may be any equipment suitable for separating the exhaust gas and dust 366 into a dust, or unders, stream and dust collector exhaust gas 376, substantially water vapor. The return unders 353 may be supplied to the solution tank 352 and the dust collector exhaust gas 376 may be sent for further processing.

It is also possible for at least a portion of the unders (either from the recycle unders 392 or the return unders 353) could be removed from the system.

The dust collector exhaust gas 376 may undergo further cleaning using an acceptable wet scrubber 378 (for example a venture scrubber or other acceptable scrubber capable of reducing the dust content to less than 10 mg/m$^3$) to produce a scrubbed exhaust gas. The wet scrubber 378 may use a combination of water from the wet scrubber 378 (such as wet scrubber water recycle stream 397) and fresh water (make-up water to wet scrubber 399) to provide water to the wet scrubber 396.

Make-up water to wet scrubber 399 may be needed to account for the loss of water in the scrubber and the water evaporated as a result of evaporative drying in the fluidized bed spray granulator 393. Some water, wet scrubber water purge 398, may be removed from the wet scrubber water recycle stream 397 to prevent the concentration dust from exceeding saturation. Scrubbed exhaust gas 379 may then vented into the atmosphere through the scrubber exhaust fan 380 or other suitable equipment.

Controlling the granule particle size is important to maintaining equilibrium during granulation in the fluidized bed spray granulator 393. To monitor and control particle size, an external particle size control system may be used. This external particle size control system could be located outside the main fluidized bed spray granulator 393 as shown in FIG. 3 and could include screening, granulator product screener 372, and a crusher 382. The crusher 382 may be any suitable equipment such as a roll mill crusher arrangement, a zigzag sifter, a sifting discharge tube, or other equipment that carries out similar functions.

The granulator product 371 may have differently sized dry granules, which are produced in the fluidized bed spray granulator 393 and removed from the fluidized bed spray granulator 393. The different sized granules are separated by the product granulator screen 372 into three categories: overs 381, middle fraction 384, and unders.

Of the granulator product 371, roughly 20% are considered unders (dust or fines). These unders are recycled unders 392 returned to the fluidized bed spray granulator 393 to function as seed granules (or evaporative drying seeds) and unders to dust collector 373 fed to the dust collector 374. From the dust collector 374, these unders are added to the solution tank 352 to provide salt needed to produce the enriched salt solution 355.

The middle fraction 384 may contain roughly 75% of the total granule stream removed from the fluidized bed spray granulator 393. After separation, the middle fraction 384 is transferred into intermediate storage, such as a middles storage silo 386.

The middle fraction 384 may be divided into multiple portions. At least a portion of the middle fraction 384 can be saved and used in the water treatment plant (not shown) should the water treatment plant experience an upset and be stopped (idled) or be restarted. Use of the middle fraction 384 in the water treatment plant during startup may save several hours of startup time as well as reduce the final quantity of solid waste brine to be sent for disposal. At least a portion of the middle fraction 384 may be discharged from the middles storage silo 386 through optional rotary valve 388 and may be recycled to the fluidized bed spray granulator 393 as middles return 389 thereby providing particle size control within the fluidized bed spray granulator 393. It is also possible for the middles return 389, and therefore a portion of the middle fraction 384, to the fluidized bed spray granulator 393 to be used as granules or evaporative drying seeds.

The portion of middles return 389 recycled to the fluidized bed spray granulator 393 for particle size control may be one to ten, or one to seven times the volume of the middle fraction 384 having left the fluidized bed spray granulator 393 as a portion of the granulator product 371. At least a portion of the middle fraction 384 not saved and used elsewhere as previously discussed, may be removed from the process as the final product, solid waste brine 387.

The solid waste brine 387 (also referred to as net production rate or excess middles) is low in water content, so the volume is significantly lower than processes where no fluidized bed spray granulator system is used. The solids concentration of the enriched salt solution prior to contact in the fluidized bed spray granulator system may be about 14% solids concentration (86% percent liquid concentration) while the solid waste brine (or net production rate or excess middles) may have a solids concentration of 99.9% (0.1% liquid concentration). As an example using this process, 2,400 BPD of liquid feed 351 having a beginning concentration of 13 to 14% solids will produce about 2,600 kg/hr of solid waste brine 387 having a dryness of 99.5%

The remainder (e.g., 5%) of the granulator product 371 removed from the fluidized bed spray granulator 393 is overs 381 (including lumps, lumps typically are found in the "overs" fraction). Overs 381 may be crushed and returned to the fluidized bed spray granulator 393 for uses as described above.

FIG. 3A shows a fluidized bed spray granulator system with exhaust gas recirculation 300A. As an alternative to releasing the scrubbed exhaust gas 379, a product of the wet scrubber 378 shown in FIG. 3, the scrubbed exhaust gas 379 may be divided and a portion of the scrubbed exhaust gas 379 used in the combustor 364 as recycled scrubbed exhaust gas 379B.

Using the recycled scrubbed exhaust gas 379B as combustion gas allows the quantity of ambient air 362, and perhaps even fuel gas 363, required from outside sources to provide hot gas 365 to the fluidized bed spray granulator 393, to be reduced. This means hot gas 365 supplied to the fluidized bed 395, in some embodiments, may be a combustion product of ambient air 362, fuel gas 363 and recycled scrubbed exhaust gas 379B.

A second portion of the scrubbed exhaust gas 379 not used in the combustor 364 may be removed from the system as purged scrubbed exhaust gas 379A. Reducing the quantity, but not elimination, of scrubbed exhaust gas 379 required to be removed from the system may improve the energy efficiency of the system and reduces environment concerns caused by a release of scrubbed exhaust gas 379.

Figure 3B:
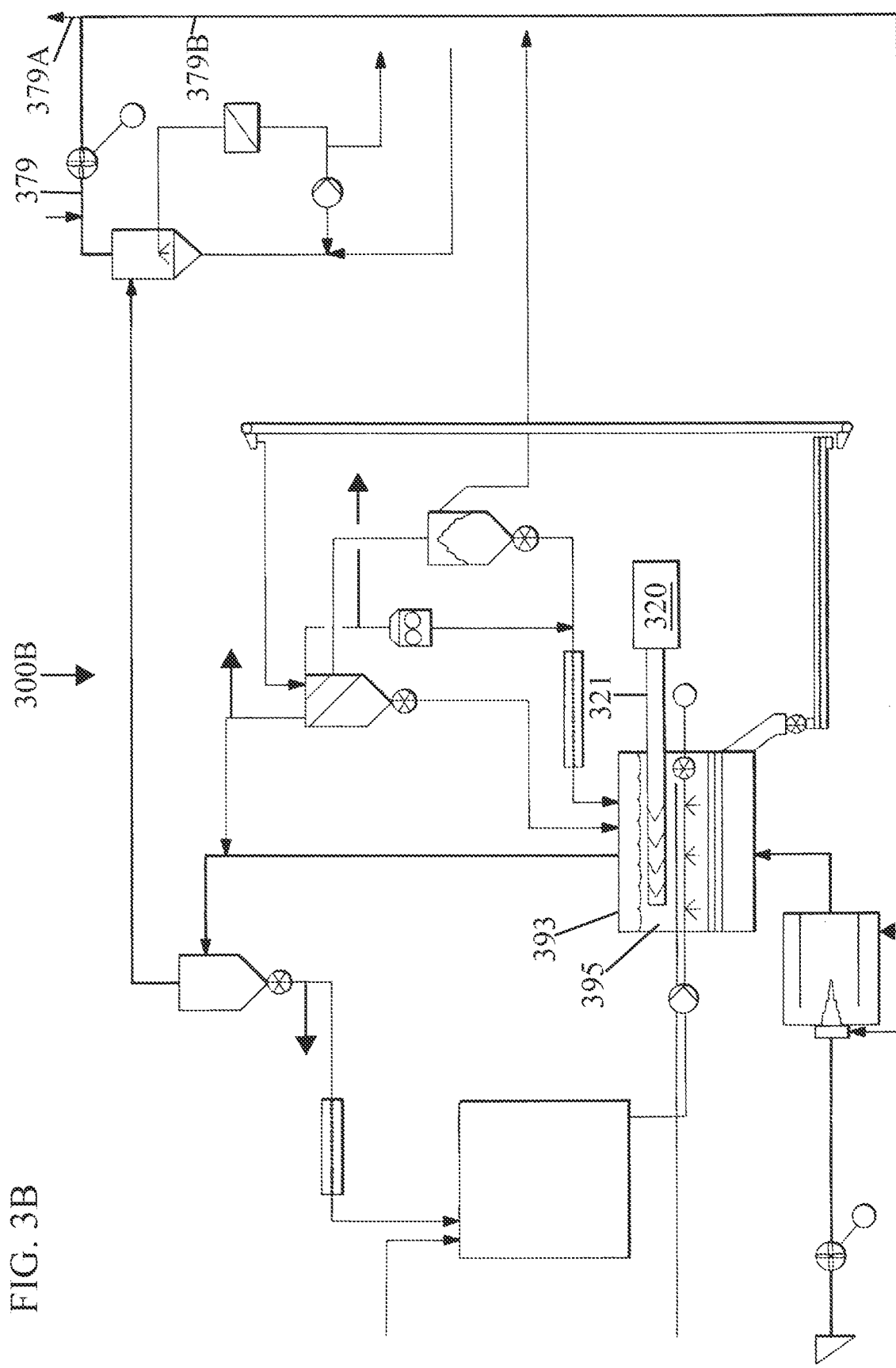
FIG. 3B schematically exemplifies a process flow diagram of a fluidized bed spray granulator system with exhaust gas recirculation and submerged imbedded heat exchangers.

An additional energy improvement to the fluidized bed spray granulator system 300A may be to submerge an imbedded heat exchanger 321 in the fluidized bed 395 of the fluidized bed spray granulator 393 (FIG. 3B, system 300B). The imbedded heat exchanger 321 assists in the evaporative drying occurring in the fluidized bed 395. A source of heat 320 for the imbedded heat exchanger 321 may be steam or hot oil or other available and suitable heat source. Using the imbedded heat exchanger 321 may allow for improved control of the heat within the fluidized bed 395.

Figure 3C:
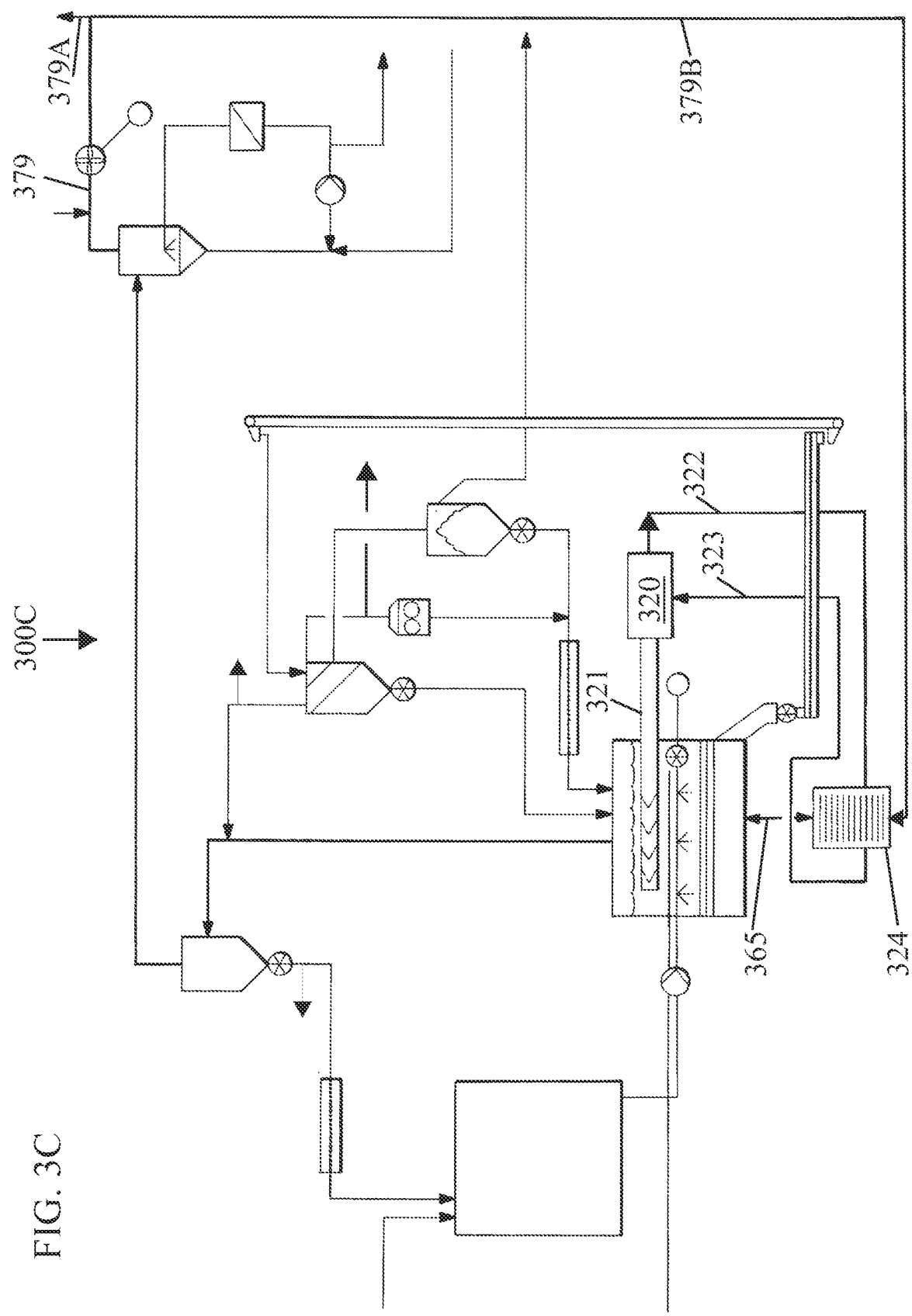
FIG. 3C schematically exemplifies a process flow diagram of a fluidized bed spray granulator system with exhaust gas recirculation, no external gas combustion and submerged imbedded heat exchangers.

FIG. 3C shows a process flow diagram of a fluidized bed granulator spray system with closed loop gas recirculation and submerged imbedded heat exchangers 300C. The process shown in FIG. 3C is another embodiment of the fluidized bed spray granulator system 300 shown in FIG. 3.

In the embodiment of FIG. 3C, no external source of ambient air 362 (shown in FIGS. 3, 3A, and 3B) or fuel gas 363 (shown in FIGS. 3, 3A, and 3B) is required and combustor 364 (shown in FIGS. 3, 3A, and 3B) has been removed and replaced with a heater 324. Heater 324 may be a heat exchanger or other equipment capable of transferring heat from a hot stream (the hot stream may be hot gas or hot liquid from source of heat 320) to a cool gas.

In the fluidized bed spray granulator system 300C with closed loop gas recirculation and submerged imbedded heat exchangers, recycled scrubbed exhaust gas 379B is used as the cool gas to be heated in heater 324. The cool gas (recycled scrubbed exhaust gas 379B) is heated in heater 324 by hot heater medium 322 and may be used in the fluidized bed 395 within the fluidized bed spray granulator 393 as hot gas 365, and as gas 323 to source of heat 320. This embodiment has hot gas 365 as a product of the exchange of heat between recycled scrubbed exhaust gas and hot heater medium and may also include the imbedded heat exchanger 321.

Figure 3D:
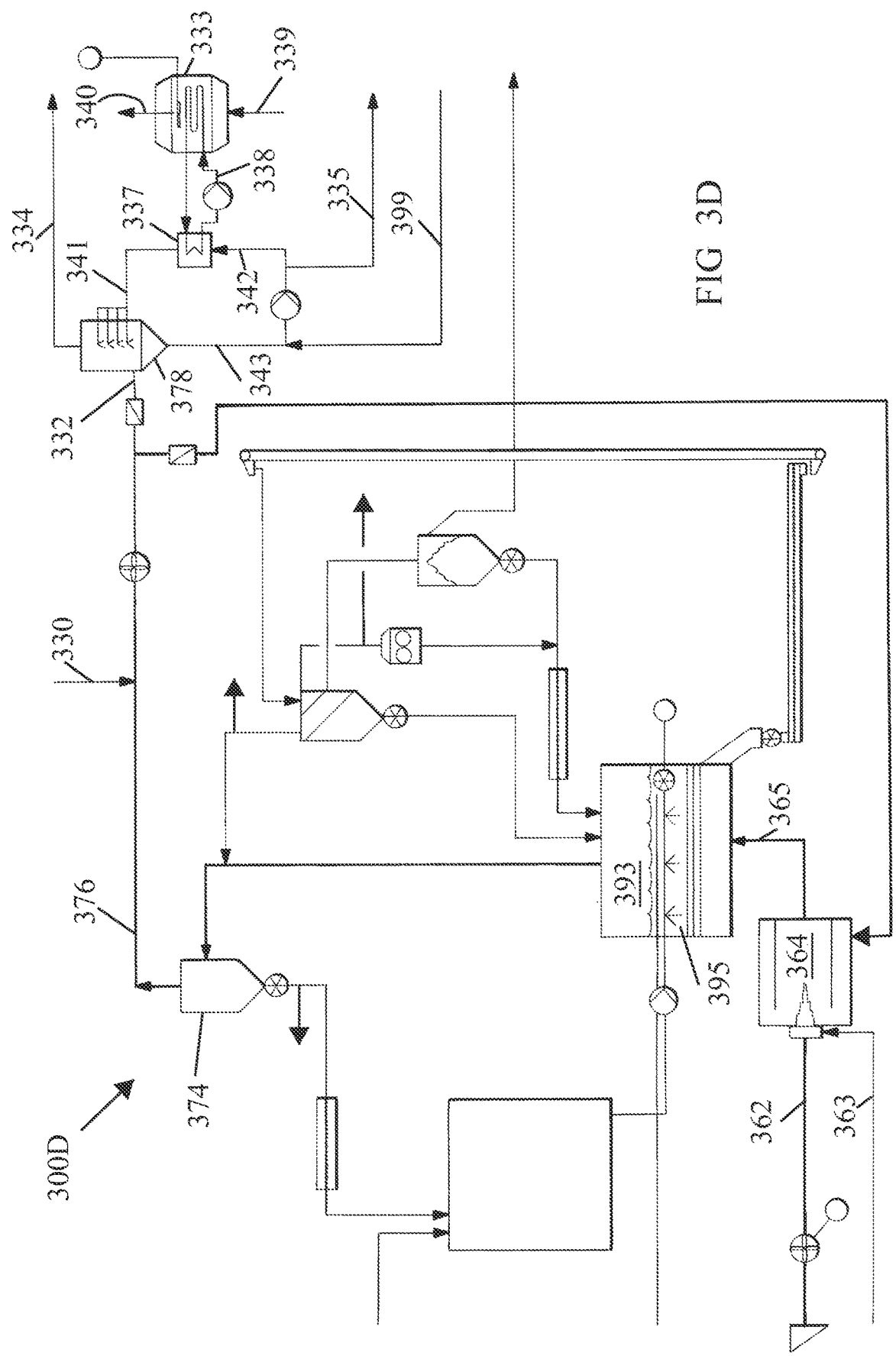
FIG. 3D schematically exemplifies a process flow diagram of a fluidized bed spray granulator system with burner self-inertization and external condensation of exhaust gas using glycol and a dry air cooling tower.

FIG. 3D shows a process flow diagram of a fluidized bed spray granulator system with cooling tower and scrubber water cooling device 300D. The fluidized bed granulator spray system with cooling tower and scrubber water cooling device 300D includes a combustor 364 capable of self-inertization. Self-inertization allows for the burning of solids in a stream to produce heat and inert burned material. In the fluidized bed spray granulator system with cooling tower and scrubber water cooling device 300D, burning of the solids in the recycled dust collector exhaust gas 336 occurs while providing for condensation of solids remaining in the wet scrubber feed stream (a portion of the dust collector exhaust gas 376) 332 using glycol and a dry air cooling tower prior to purged scrubbed air 334 being removed from the system. It may be possible to purge the purged scrubber air 334 to the atmosphere.

In the embodiment shown in FIG. 3D, inert gas 330 may be used to start up the wet scrubber 378 and provide material similar to the dust collector exhaust gas 376 as recycled dust collector exhaust gas 336 to the combustor 364. Combustor 364 may use ambient air 362 along with fuel gas 363 and recycled dust collector exhaust gas 336 to provided hot gas 365 and also to self-inertization the solids in the recycled dust collector exhaust gas 336.

The hot gas 365 may be fed to the fluidized bed spray granulator 393 at a location within the fluidized bed 395 to provide the medium for fluidization and heat for the fluidized bed spray granulator 393.

A portion of the dust collector exhaust gas 376 not recycled to the combustor 364 forms a wet scrubber feed stream 332. The wet scrubber feed stream 332 may contain small quantities of solid materials (unders or dust) entrained in the exhaust air and dust 366 from the fluidized bed spray granulator 393.

To facilitate a possible increase the efficiency of removal of any solids remaining in the wet scrubber feed stream 332, a cooling tower 333 may be used along with a cooling system cooling device, such as a cooling system heat exchanger 337 to provide cooling for a cooling circuit liquid 338. The cooling circuit liquid 338 may be glycol or other suitable liquid. Dry air 339 enters the cooling tower 333 as does cooling system liquid 338. The cooling system liquid 338 enters the cooling tower 333 at a temperature higher than the dry air 339 entering the cooling tower 333.

While in the cooling tower 333, the cooling system liquid 338 is cooled by the dry air 339. It may be necessary to have a closed system for the cooling circuit liquid 338 within the cooling tower 333. A closed system should ensure no loss of cooling circuit liquid 338. Such a system may include tubes for the cooling system liquid 338 within the structure of the cooling tower 333.

Because dry air 339 is used as coolant for the cooling circuit liquid 338, it is necessary for dry air 339 to be lower in temperature than the cooling circuit liquid 338 and the hot dry air 340. Once the cooling circuit liquid 338 has been cooled, hot dry air 340 leaves the cooling tower 333.

The cool cooling circuit liquid 338 is sent to the cooling system cooling device 337 (for example a heat exchanger or other suitable device). In the cooling system device 337, make-up water to wet scrubber 399 and recycled wet scrubber water 343 are mixed and a portion of the mixture may be removed as evaporated water purge 335. Recycled wet scrubber water 343 is the water leaving the wet scrubber 378 containing solids particles separated from the wet scrubber feed stream 332 while in the wet scrubber 378.

The remaining stream, warm scrubber water 342, is cooled by the cooling circuit liquid 338 to produce cool scrubber water 341. Cool scrubber water 341 is sent to the wet scrubber 378 where it is contacted with the wet scrubber feed stream 332 to remove solid particles (such as dust) from the wet scrubber feed stream 332 thereby producing a scrubbed exhaust gas stream or purged scrubber air 334. The purged scrubber air 334 is vented or otherwise removed from the wet scrubber 378 and from the fluidized bed granulator spray system with cooling tower and scrubber water cooling device 300D, possibly purged to the atmosphere.

FIG. 4 schematically illustrates a process flow diagram for a combined warm/hot lime produced water treatment system and a fluidized bed granulator system, a combined lime/granulator system 400. The combined lime/granulator system 400 incorporates the fluidized bed spray granulator system within a warm/hot lime produced water treatment system.

In the combined lime/granulator system 400 produced water 401 is sent to a free water knockout step 402 followed by a de-oiling process 403. The de-oiling process 403 provides two products 421, 422. De-oiling process product A 421 is funneled into a slop treatment 404. Slop treatment 404 may use a filter press and centrifuge to further separate and reduce the waste. Slop treated stream 426 is removed from the system.

De-oiling product B 422 is channeled into a warm lime softening or hot lime softening process (warm/hot lime softening process) 405. A warm/hot lime softening process 405 may utilize lime, magnesium oxide, or soda from silo 406 and sometimes requires silica, calcium, and magnesium reduction as well as make-up water 407.

The warm/hot lime softening process 405 has two products. One product from the warm/hot lime softening process 405, characterized as lime softener sludge 423, is directed to the fluidized bed spray granulator system 300 (as exemplified in FIG. 3).

The second product from the warm/hot lime softening process 405, lime softening liquid 424 is filtered in filters 409. The filtered waste water 427 from the filters 409 may be further processed by a weak acid cation exchange and/or strong acid cation exchange (weak/strong acid cation exchange 410) or a coke or sludge from after filter 485 and may be sent to the fluidized bed spray granulator system 300.

Filtered waste water 427 from filters 409 may be further processed by a weak acid cation exchange and/or strong acid cation exchange (weak/strong acid cation exchange 410).

The resulting acid cation exchange stream 411 from the weak/strong cation exchange 410 may be transferred to an OTSG 412. The OTSG 412 produces OTSG steam 412S and an OTSG waste product 414. OTSG steam 412S is available and may be injected into a steam injection well 413. The OTSG waste product 414 is transferred to a blowdown evaporator 415 where water is evaporated off of the OTSG waste product 414. Blowdown evaporator water 416 from the blowdown evaporator 415 may be recycled to the weak/strong acid cation exchange 410 and subsequently to the OTSG 412.

The blowdown evaporator waste 425 is sent to the fluidized bed spray granulator system 300 along with lime softener sludge 423 and cake or sludge from after filter 485. Products from the fluidized bed spray granulator system 300 are solid waste brine 387 and scrubber exhaust gas 379.

FIG. 5 schematically illustrates a process flow diagram for a combined evaporator produced water treatment system and a fluidized bed granulator system. A combined evaporator/granulator system 500 incorporates the fluidized bed spray granulator system within an evaporator produced water treatment system.

In the combined evaporator/granulator system 500, produced water 501 is funneled through a free water knockout step 502, and then through a de-oiling process 503. De-oiling process 503 is similar to the de-oiling process 403, of the combined lime/granulator system 400 of FIG. 4, but in the combined evaporator/granulator system 500 the de-oiling process 503 yields a single product stream, evap de-oiling product 556.

The evap de-oiling product 556 is sent to an evaporator 550. Evaporator 550, much like other evaporators, produces two product streams: evaporator product A 557 and evaporator product B 558. Evaporator product A 557 may be sent to a drum boiler 551, or possibly an OTSG, where steam is produced and the resulting steam used in steam injection wells 513.

The second product from evaporator 550 is evaporator product B 558. Evaporator product B 558 can be classified as a sludge waste and may be sent to a secondary treatment step 553. Secondary treatment step 553 can take various forms and may also include filter press, centrifuge or other forms of filtration.

Useable water 559 resulting from the secondary treatment step 553 may be directed back into the evaporator 550. It may also be necessary to add make-up water 507 to evaporator 550. A remaining stream, secondary treatment waste 560, may be channeled to the fluidized bed spray granulator system 300.

An embodiment is a method of recovering solid waste from produced water in an oil sands system for the production of oil and other hydrocarbons utilizing a fluidized bed, the method comprising the steps of: transferring an amount of produced water into a solution tank; producing an enriched salt solution in the solution tank; transferring the enriched salt solution using at least one spray nozzle into a fluidized bed of a fluidized bed spray granulator; heating the fluidized bed with a hot gas; growing granules within the fluidized bed through evaporative drying of salt from the enriched salt solution; extracting the granules from the fluidized bed spray granulator to produce a granulator product; separating at least a portion of the granulator product into at least two fractions; and removing at least a portion of at least one of the at least two fractions from the system as solid waste brine product.

An embodiment is also a system for recovering solid waste from produced water recovered from an oil sands system for the production of oil and other hydrocarbons, the system comprising: a solution tank configured for producing an enriched salt solution from an amount of produced water transferred into the solution tank; a fluidized bed spray granulator; at least one spray nozzle for spraying the enriched salt solution produced in the solution tank into a fluidized bed formed in the fluidized bed spray granulator; a heating device for heating the fluidized bed with a hot gas; a drying device for evaporative drying of salt from the enriched salt solution for growing granules within the fluidized bed; an extracting device for extracting granules from the fluidized bed spray granulator to produce a granulator product; a granulator product screener for separating at least a portion of the granulator product into at least two fractions; and a discharge device for removing at least a portion of at least one of the at least two fractions from the system as solid waste brine product.

In some embodiments the at least two fractions may be at least two of an unders fraction, a middles fraction and an overs fraction. In some embodiments the at least two fractions may be at least three fractions and the at least three fractions may be an unders fraction, a middle fraction and an overs fraction.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of recovering solid waste from produced water in an oil sands system utilizing a fluidized bed, the method comprising the steps of:
    transferring an amount of produced water into a solution tank;
    increasing the amount of a salt concentration of the produced water to produce an enriched salt solution in the solution tank, wherein the enriched salt solution is a solution near the solution's salt saturation point, and wherein an enriched salt solution near the salt solution's saturation point is a salt solution at 25-27 weight percent salt solids concentration at 50 degrees Celsius;
    transferring the enriched salt solution using at least one spray nozzle into a fluidized bed of a fluidized bed spray granulator;
    heating the fluidized bed with a gas;
    growing granules within the fluidized bed through evaporative drying of salt from the enriched salt solution;
    extracting the granules from the fluidized bed spray granulator to produce a granulator product;
    separating at least a portion of the granulator product into at least two fractions comprising an unders fraction and an overs fraction; and
    removing at least a portion of at least one of the at least two fractions from the system as solid waste brine product.

2. The method of claim 1, wherein the at least one spray nozzle is submerged within the fluidized bed.

3. The method of claim 1, wherein the at least two fractions comprise at least two of the unders fraction, a middle fraction, and the overs fraction.

4. The method of claim 1 further comprising the step of combusting ambient air and fuel gas to generate the gas supplied to the fluidized bed.

5. The method of claim 1 further comprising the step of combusting ambient air, fuel gas and recycled scrubbed exhaust gas to generate the gas supplied to the fluidized bed.

6. The method of claim 1, wherein an imbedded heat exchanger is submerged in the fluidized bed of the fluidized bed spray granulator.

7. The method of claim 1 further comprising the step of exchanging heat between recycled scrubbed exhaust gas and a heater medium to generate the gas supplied to the fluidized bed.

8. The method of claim 7, wherein an imbedded heat exchanger is submerged in the fluidized bed of the fluidized bed spray granulator.

9. The method of claim 1 further comprising the step of producing an exhaust gas and dust stream in the fluidized bed spray granulator.

10. The method of claim 9, wherein a fraction of the at least two fractions is the unders fraction, the method further comprising the step of removing at least a portion of the unders fraction with the exhaust gas and dust from the fluidized bed spray granulator.

11. The method of claim 9 further comprising the step of separating exhaust gas and dust from at least a portion of the exhaust gas and dust stream from the fluidized bed spray granulator to form a return unders and a dust collector exhaust gas.

12. The method of claim 11 further comprising the step of treating at least a portion of the dust collector exhaust gas to produce a scrubbed exhaust gas.

13. The method of claim 12 further comprising the step of releasing the scrubbed exhaust gas to an atmosphere.

14. The method of claim 3 further comprising the step of returning at least a portion of the middle fraction from the fluidized bed spray granulator to the fluidized bed as evaporative drying seeds.

15. The method of claim 1 further comprising the steps of:
separating at least a portion of the granulator product into three fractions: the overs fraction, a middle fraction, and the unders fraction;
crushing to reduce a size of the overs fraction to form crushed overs;
recycling of the crushed overs to the fluidized bed of the fluidized bed spray granulator;
recycling at least a portion of the unders fraction to the fluidized bed of the fluidized bed spray granulator as evaporative drying seeds;
recycling at least a portion of the middle fraction to the fluidized bed of the fluidized bed spray granulator for granule size control.

16. The method of claim 1 further comprising the step of combusting ambient air, fuel gas and recycled dust collector exhaust gas to generate the gas supplied to the fluidized bed.

17. The method of claim 12 further comprising the step of treating the scrubbed exhaust gas stream with cool scrubber water.

18. The method of claim 17 further comprising the step of producing the cool scrubber water by a cooling circuit liquid.

19. The method of claim 18 further comprising the step of producing the cooling circuit liquid through a cooling tower and a cooling system cooling device.

20. The method of claim 18, wherein the cooling circuit liquid is glycol.

21. The method of claim 12 further comprising the step of purging the scrubbed exhaust gas stream to an atmosphere.

22. The method of claim 1, wherein a fraction of the at least two fractions is the overs fraction, the method further comprising the step of recycling at least a portion of the overs fraction to the fluidized bed spray granulator.

23. The method of claim 1, wherein a fraction of the at least two fractions is the overs fraction, the method further comprising the step of removing at least a part of the overs fraction as a solid waste brine product.

24. The method of claim 22 further comprising the step of reducing a size of the granules in the overs fraction from the fluidized bed spray granulator prior to recycling to the fluidized bed.

25. The method of claim 1, wherein a fraction of the at least two fractions is the unders fraction, the method further comprising the step of recycling at least a portion of the unders fraction to the fluidized bed spray granulator.

26. The method of claim 1, wherein a fraction of the at least two fractions is the unders fraction, the method further comprising the step of discharging at least a portion of the unders fraction from the system as a solid waste brine product.

27. The method of claim 15 further comprising the step of recycling at least a portion of the middle fraction to the fluidized bed spray granulator.

28. The method of claim 11 further comprising the step of recycling at least a portion of the return unders to the solution tank.

29. The method of claim 1, wherein the least two fractions comprise the unders fraction and the overs fraction, the method further comprising the step of removing at least a portion of the unders fraction and at least a portion of the overs fraction as the solid waste brine product.

30. The method of claim 15 further comprising the step of removing at least a portion of the middle fraction as the solid waste brine product.

* * * * *